United States Patent

Sander et al.

[15] 3,654,610

[45] Apr. 4, 1972

[54] USE OF FAULTY STORAGE CIRCUITS BY POSITION CODING

[72] Inventors: Wendell B. Sander, Los Altos; Frank S. Greene, Jr., San Jose, both of Calif.

[73] Assignee: Fairchild Camera and Instrument Corporation, Mountain View, Calif.

[22] Filed: Sept. 28, 1970

[21] Appl. No.: 76,056

[52] U.S. Cl. ....................340/172.5

[51] Int. Cl. ....................G06f 5/02, G06f 11/00

[58] Field of Search ....................340/172.5, 347 DD, 174 ED; 235/153

[56] References Cited

UNITED STATES PATENTS

| | | | |
|---|---|---|---|
| 3,422,402 | 1/1969 | Sakalay | 340/172.5 |
| 3,434,116 | 3/1969 | Anacker | 340/172.5 |
| 3,234,521 | 2/1966 | Weisbecker | 340/172.5 |
| 3,331,058 | 7/1967 | Perkins, Jr. | 340/172.5 |
| 3,421,148 | 1/1969 | Howells et al. | 340/172.5 |
| 3,444,526 | 5/1969 | Fletcher | 340/172.5 |

*Primary Examiner*—Paul J. Henon
*Assistant Examiner*—Melvin B. Chapnick
*Attorney*—Roger S. Borovoy, Alan H. MacPherson and Charles L. Botsford

[57] ABSTRACT

A memory system having an array of a predetermined number of storage cells, each for storing a single bit of binary information, arranged in rows and columns, the rows and columns each having binary addresses, the system including at least one redundant row of storage cells and one or more defective rows, or at least one redundant column of storage cells and one or more defective columns, or both. The contained cells of the redundant rows or columns are not required to make up the required number of storage cells. A code converter is embodied for converting the binary addresses of each of the rows and columns of the system to combinatorial addresses, each combinatorial address being associated with a row or column of the array, the maximum number of combinatorial addresses to which the binary addresses of all the rows or all the columns may be converted being at least one more than the maximum number of binary addresses of all the rows or all the columns, there being no binary address associated with the additional combinatorial addresses. A connection mechanism is included for connecting the code converter to the array of storage cells, the connection providing that the additional combinatorial addresses are associated with the defective rows or columns, and the combinatorial addresses with which the binary addresses of the defective rows or columns would normally be associated are associated with the redundant rows or columns.

6 Claims, 3 Drawing Figures

Figures 1, 3:
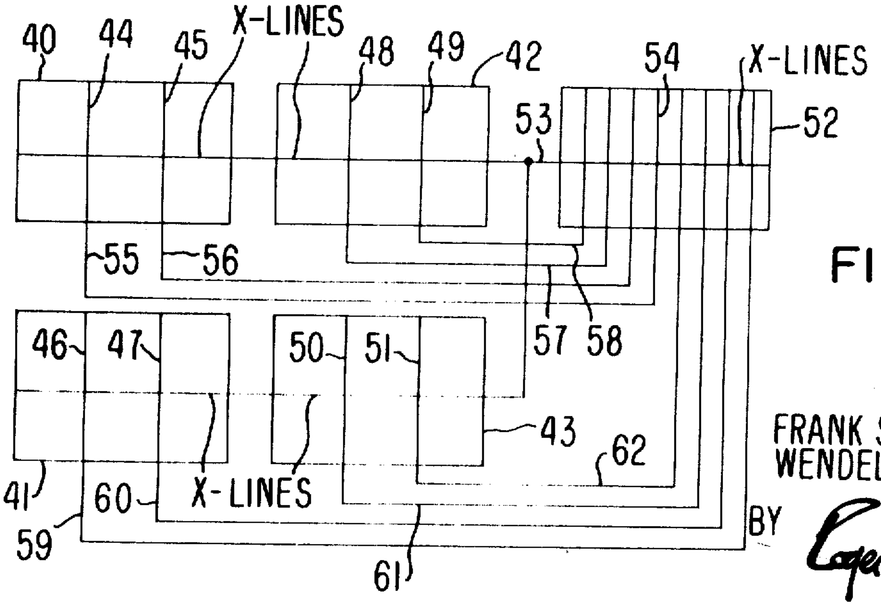

| OLD Y-LINE NO. | BINARY ADDRESS A B C D | OLD COMBINATORIAL ADDRESS $C_1 C_2 C_3 C_4 C_5 C_6$ | NEW COMBINATORIAL ADDRESS $C_1 C_3 C_2 C_4 C_5 C_6$ | NEW Y-LINE NO. |
|---|---|---|---|---|
| 1 | 0 0 0 0 | 1 1 1 0 0 0 | 1 1 1 0 0 0 | 1 |
| 2 | 0 0 0 1 | 1 1 0 1 0 0 | 1 0 1 1 0 0 | 5 |
| 3 | 0 0 1 0 | 1 1 0 0 1 0 | 1 0 1 0 1 0 | 7 |
| *4 | 0 0 1 1 | 1 1 0 0 0 1 | 1 0 1 0 0 1 | 17 |
| 5 | 0 1 0 0 | 1 0 1 1 0 0 | 1 1 0 1 0 0 | 2 |
| 6 | 0 1 0 1 | 1 0 0 1 0 1 | 1 0 0 1 0 1 | 6 |
| 7 | 0 1 1 0 | 1 0 1 0 1 0 | 1 1 0 0 1 0 | 3 |
| 8 | 0 1 1 1 | 1 0 0 0 1 1 | 1 0 0 0 1 1 | 8 |
| 9 | 1 0 0 0 | 0 1 1 0 1 0 | 0 1 1 0 1 0 | 9 |
| 10 | 1 0 0 1 | 0 1 1 1 0 0 | 0 1 1 1 0 0 | 10 |
| 11 | 1 0 1 0 | 0 1 0 0 1 1 | 0 0 1 0 1 1 | 15 |
| 12 | 1 0 1 1 | 0 1 0 1 0 1 | 0 0 1 1 0 1 | 14 |
| *13 | 1 1 0 0 | 0 0 1 1 1 0 | 0 1 0 1 1 0 | 20 |
| 14 | 1 1 0 1 | 0 0 1 1 0 1 | 0 1 0 1 0 1 | 12 |
| 15 | 1 1 1 0 | 0 0 1 0 1 1 | 0 1 0 0 1 1 | 11 |
| 16 | 1 1 1 1 | 0 0 0 1 1 1 | 0 0 0 1 1 1 | 16 |
| 17 | NONE | 1 0 1 0 0 1 | 1 1 0 0 0 1 | 4 |
| 18 | NONE | 1 0 0 1 1 0 | 1 0 0 1 1 0 | 18 |
| 19 | NONE | 0 1 1 0 0 1 | 0 1 1 0 0 1 | 19 |
| 20 | NONE | 0 1 0 1 1 0 | 0 0 1 1 1 0 | 13 |

*DEFECTIVE Y-LINES

INVENTORS
FRANK S. GREENE JR.
WENDELL B. SANDER
BY [signature]
ATTORNEY

INVENTORS
FRANK S. GREENE JR.
WENDELL B. SANDER
BY [signature]
ATTORNEY

USE OF FAULTY STORAGE CIRCUITS BY POSITION CODING

FIELD OF THE INVENTION

The subject invention is in the field of solid-state memory devices. Such devices are presently being fabricated with magnetic cores. In the last few years, the art is turning towards semiconductor devices for computer storage. The advantages of semiconductors over cores are increased read and write speed into and out of the memory and logic voltage levels which are directly compatible with the semiconductor logic employed in the computer itself. Recent advances in the art of fabrication of semiconductor devices have brought the costs of these units closer into line with economical core storage systems.

The cost of a semiconductor memory device is directly related to yield. The economies of manufacture of semiconductor devices do not approach that of cores unless a fairly large number of cells are fabricated in a single semiconductor chip. A common number employed in devices presently on the market is 256 bits of binary storage on a single chip. The electronic circuitry for storage requires more than 1,000 transistors on a single chip to store 256 binary bits. With the present state of technology, the yields of totally good chips of this complexity are quite low.

Accordingly, it is desirable to have a memory system whereby chips having defective bits, or defective rows or columns of bits, can be used. Various wiring schemes to achieve this have been proposed. Most of them require direct wiring changes from the interconnection pads on the chip to the package containing the chip so that the bad rows or columns are wired out of the circuit within the package. Alternatively, the printed circuit board to which the package is to be inserted can be designed to completely avoid certain pins of the integrated circuit package. The avoided pins are those directed to the bad rows or columns.

BRIEF DESCRIPTION OF THE INVENTION

The subject invention pertains to a memory system which makes use of a monolithic semiconductor memory array having defective rows or columns or both, but which makes possible the wiring of all the connector pads of each integrated circuit irrespective of the existence of the bad bits, rows, or columns. Briefly, the memory system of the invention includes: an array of a predetermined number of storage cells, each for storing a single bit of binary information, arranged in rows and columns, the rows and columns each having binary addresses, including: at least one redundant row of storage cells and at least one defective row, or at least one redundant column of storage cells and at least one defective column, or both, the contained cells of the redundant rows or columns not being required to make up the predetermined number of storage cells and the number of redundant rows and columns being at least equal to the number of defective rows and columns; a code converter for combining the binary addresses of each of the rows and columns of the system to combinatorial addresses, each combinatorial address being associated with a row or column of the array, the maximum of combinatorial addresses to which the binary addresses of all the rows or all the columns may be converted being at least one more than the maximum of binary addresses of all the rows or all the columns, there being no binary addresses associated with the additional combinatorial addresses; and a means selectively connecting the code converter to the array of storage cells, the connection providing that the additional combinatorial addresses are associated with the defective rows or columns, and the combinatorial addresses with which the binary addresses of the defective rows or columns would normally be associated are associated with the redundant rows or columns.

In one embodiment of the invention, the redundant rows or columns are included in the same single chip of semiconductor material having the defective rows or columns. In another embodiment, connections are made among different chips to provide the redundant rows or columns. However, in both embodiments, all of the interconnection pads of each array are connected in a predetermined fashion without need of avoiding pins directed to defective columns or rows. Assembly of these arrays of the invention is therefore more uniform and thus simpler. Furthermore, when the package is plugged into the printed circuit board, all pins are connected.

Figure 2:
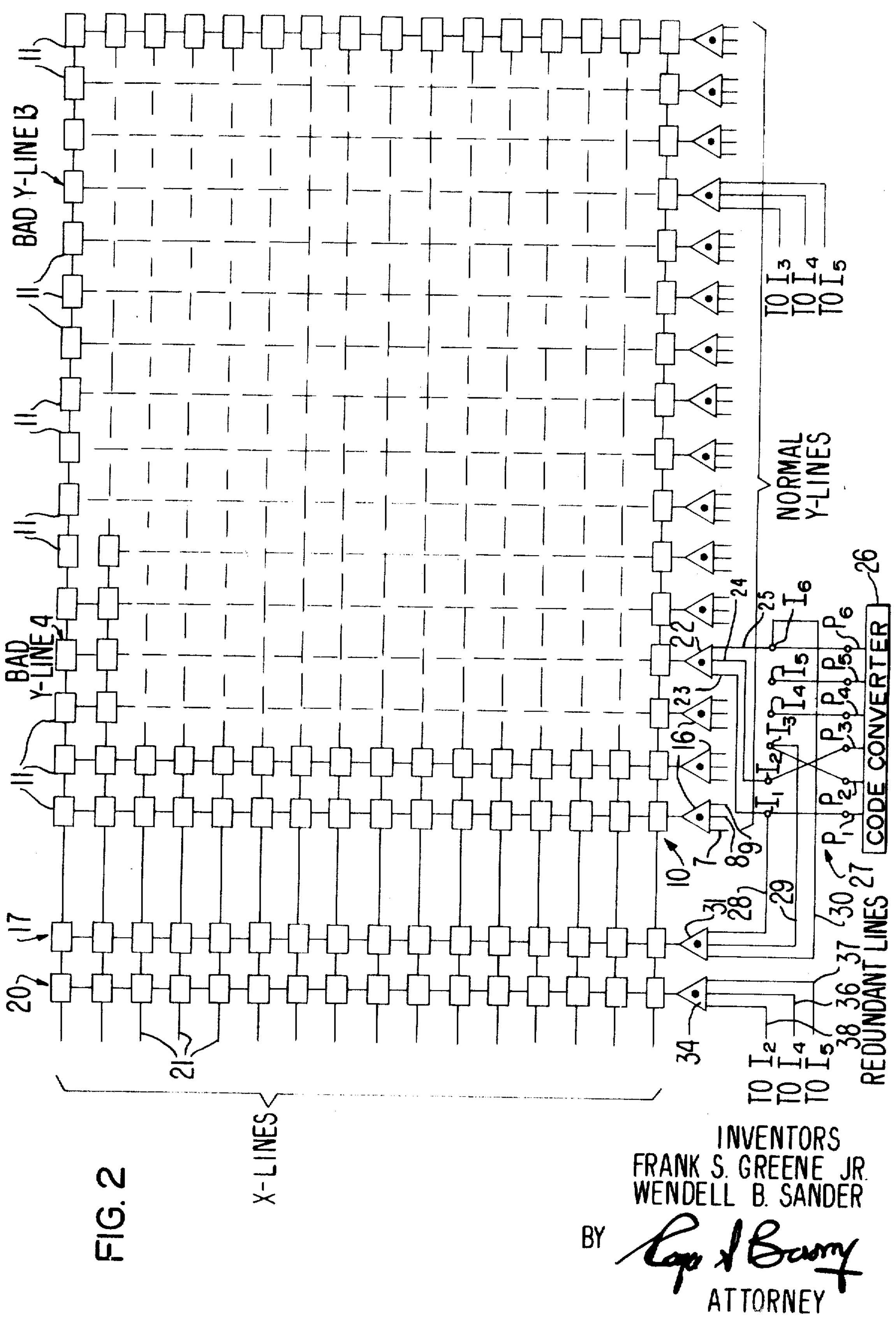

The details of the invention will be better understood from the detailed specification which follows, making reference to the drawings in which:

FIG. 1 is a logic and code table illustrating one embodiment of the invention; and FIG. 2 is a somewhat schematic, block diagram of one embodiment of the invention; and FIG. 3 is a block diagram of still another embodiment of the invention.

In order to write into and read out of a memory, it is necessary to have an addressing system to locate the particular bit on the array on the semiconductor chip into which data are to be written or from which data are to be read. Obviously one technique would be to wire the X and Y address for each row and each column in the matrix from the chip to the package. However, for a 256 bit chip, having 16 rows and 16 columns, this would mean the use of up to 48 connection pads on the chip and 48 pins on the package (plus two additional pins for power supply). With the present state of the art, there is not sufficient room on a 256-bit memory chip of silicon to permit the attachment of 50 wires without a large increase in the chip size. Although as many as 36 connections have been made on a very large chip in low yield, the packaging requirements are extremely complicated and expensive. Accordingly, economical integrated circuits for memories are limited to 16 or at most 24 pads and pins.

In order to reduce the 50 connections to 16, the address selection must be decoded on the chip. This decoding might be simple binary. However it has been found advantageous, instead of using binary, to use combinatorial decoding. The combinatorial form of decoding decreases the amount of logic required to be placed on the chip. Moreover, the logic required for combinatorial decoding is easier to fabricate. Combinatorial decoding provides a good balance between the decode circuit complexity and the number of pads required on the chip. In combinatorial decoding, $$\binom{n}{m}$$

combinations of n bits taken little m at a time are employed. Binary decoding uses $2^n$ combinations. Because most computers are actually organized to provide output signals to the memory in binary form, a code converter is required to convert the binary to the combinatorial decoding.

In binary decoding of p binary variables, there are a possible $2^p$ combinations. The $2^p$ combinations can be described with the Binomial theorem in terms of the number of $p$ variables taken $q$ at a time, as shown below.

$$2^p=\sum_{q=o}^{p}\binom{p}{q}=\binom{p}{0}+\binom{p}{1}+\ldots+\binom{p}{p} \text{ binomial theorem}$$

where $$\binom{p}{q}=\frac{p!}{(p-q)!q!}= \text{number of combinations of } p \text{ binary variables taken } q \text{ at a time.}$$

For example, if $p=4$ $$2^4=\sum_{q=o}^{4}\binom{4}{q}=\binom{4}{0}+\binom{4}{1}+\binom{4}{2}+\binom{4}{3}+\binom{4}{4}$$

$=16$ combinations.

Whereas the usual binary decoding forms use all the terms of the binomial series, combinatorial decoding uses only one term. Typically the $$\binom{p}{p/2}$$

term, p even, or the $$\binom{p}{p-1/2}$$

term, p odd, is used because it is the largest single term. When using only one term of the binomial series, more combinatorial bits are needed than noncombinatorial bits to generate all of the $2^p$ address combinations. To avoid any further confusion n will denote noncombinatorial binary bits and p will denote combinatorial binary bits. As an example, consider the case for $n=4$. There are $2^4=16$ address combinations that can be selected. This requires six combinatorial bits taken three at a time to generate at least 16 address combinations. Note, however, that actually there are 20:

$$\binom{p}{q}=\binom{6}{3}=\frac{6!}{3!3!}=20 \text{ combinations.}$$

It has now been discovered that one can take advantage of these additional four combinations to arrive at a unique addressing scheme whereby defective rows or columns can be switched to good rows or columns, either on the same chip of silicon or on different chips.

Using the example of 256 ($2^8$) bits, 16 lines are required in each direction ($2^4$). Converting to three out of six combinatorial decoding, these 16 lines in each direction in binary are converted to 20 possible combinatorial X and Y addresses. One example of such a conversion is shown in FIG. 1.

In the example of the invention, using an X–Y matrix of 256 cells (16 cells in the X direction, and 16 cells in the Y direction) the proposed 16 binary addresses for the 16 Y-lines are shown in the second column from the left in FIG. 1. Lines 4 and 13 are found to be defective, denoted by the asterisks. Y-lines 17–20 have no binary address (shown as "NONE"). In the example selected, the normal, predetermined number of required cells is 256. These cells have 16 X-addresses and 16 Y-addresses. Throughout this specification, the X-address designates a "row" and the Y-address designates a "column." Obviously these designations can be reversed.

In the third column of FIG. 1, the binary addresses in the second column are converted to combinatorial addresses. The Boolean arithmetic of this conversion is well known in the art, and the solution shown in FIG. 1 is not unique. In fact, there can be as many solutions as there are combinations of 20 things taken 16 at a time. Note that Y-line Nos. 17–20 do have combinatorial addresses even though they have no binary addresses.

The fourth and fifth columns of FIG. 1 show the new combinatorial addresses and the new Y-line numbers after the rerouting of the Y-lines. This will be discussed later in connection with the array shown in FIG. 2.

Referring to FIG. 2, a 256 bit memory array is schematically represented. Such an array has 16 memory cells in each column or Y-line and sixteen memory cells in each row or X-line. In the embodiment shown, there are two redundant Y-lines 17 and 20 also having 16 cells. Each of these memory cells, as is well known in the art, is a semiconductor circuit capable of being switched from one stable state to another. For example, a flip-flop circuit or a type of semiconductor device having two stable electrical states across a PN junction or across an oxide-semiconductor interface, or both can be used. Such devices are well described in the literature. The exact type of cell used for this invention is not critical, and is not a part of the invention. The particular embodiment selected as an example was bipolar flip-flops, and is shown on page 22 of Scientific American Magazine, Vol. 222, Feb., 1970.

In the embodiment of FIG. 2, it is assumed that there is at least one or more defective or inoperative cells in Y-lines 4 and 13. Redundant Y-lines 17 and 20 have all good cells. The invention takes advantage of the four extra combinatorial addresses corresponding to old Y-line Nos. 17–20 (FIG. 1) which are not associated with any binary address, to switch the memory circuit away from the bad lines 4 and 13 and into the redundant Y-lines 17 and 20. The mechanism will be described in detail below.

Using the combinatorial decoding of the invention, each Y-line is accessed through one of the AND gates 16. When all three input lines 7, 8 and 9 of the AND gate associated with Y-line 10 are energized, Y-line 10 has been selected. A similar selection is made through similar AND gates, not shown, to X-lines 21. AND gate 22 is accessed by energizing the three input lines 23, 24, and 25 when the bad Y-line 4 is to be selected. Referring to FIG. 1, bad Y-line 4 has a binary address 0011 and a combinatorial address 110001. Normally "1" signals correspond to an energized line and zeros to a non-energized line. This combinatorial address 110001 for Y-line 4 will be accessed when the first two and the sixth digits of the six-digit combinatorial address appear at the output of code converter 26. Code converters are available commercially. An example of such a code converter is the 93401 decoder/driver manufactured by Fairchild Camera and Instrument Corporation. To achieve this, pins P1, P2, and P6 of code converter 26 will be energized. The pins of code converter 26 are connected to the input terminals of the array, collectively numbered and individually identified as terminals I1, I2, I3, I4, I5, and I6. Pin P1 is connected directly to terminal I1. Indeed, had all the original Y-lines been operative, each pin terminal identified with a "P" number would have been connected to its corresponding input terminal having the same "I" number, exactly as pin P1 is connected to terminal I1. Had this been so, when code converter 26 was energized by the combinatorial address 110001, input terminals I1, I2, and I6 of the array would have been energized. These terminals are connected respectively to lines 23, 24, and 25 of AND gate 22. Thus with a combinatorial address which designates line 4, line 4 would have been accessed.

However, as shown in FIG. 2, pins P2 and P3 are not connected to input terminals I2 and I3, respectively. Instead, their connections are crossed, as shown, pin P2 being connected to input I3 and pin P3 being connected to input I2. Therefore, in order to energize AND gate 22 to access bad Y-line 4, it is now necessary to have, at the output pins of code converter 26, the combinatorial code which energizes lines P1, P3, and P6, or 101001. Returning to the table of FIG. 1, this combinatorial code, having 1's at digits 1, 3, and 6, corresponds to old Y-line 17 which in turn corresponds to no binary address whatsoever ("NONE"). Accordingly, if the system of the invention is operating properly, this combinatorial address 101001 will never appear at the output terminals of code converter 26 because it corresponds to no proper binary address.

Now it is necessary to see what happens, referring to FIG. 1, if the binary address 0011 is selected. This valid binary address normally would select old Y-line 4 (which is bad), since it corresponds to combinatorial address 110001. Turning to FIG. 2, pins P1, P2, and P6 of converter 26 will be energized. In that event, with the connections as shown, input terminals I1, I3, and I6 will be energized because they are connected respectively to pins P1, P2, and P6 of code converter 26. Terminals I1, I3, and I6 are connected respectively through lines 28, 29, and 30 to AND gate 31 connected to redundant Y-line 17. When the b inary address 0011 is selected and is coded into its proper combinatorial address 110001 (an address which would normally select bad Y-line 4) this address now selects redundant Y-line 17. The defective Y-line 4 is totally avoided.

Similarly, redundant Y-line 20, accessed through AND gate 34, is connected to pins I2, I4, and I5, through lines 38, 36, and 37, respectively. Input terminals I2, I4 and I5 are connected to pins P3, P4, and P5 of code converter 26. These pins correspond to old combinatorial address 001110 (FIG. 1)

which in turn corresponds to binary address 1100. Thus when binary address 1100 is desired to be accessed, and code converter 26 energizes pins P3, P4, and P5, and in turn input terminals I2, I4, and I5. These are connected through lines 38, 36, and 37 to AND gate 34 to energize good Y-line 20 rather than bad Y-line 13. Bad Y-line 13 is connected to input terminals I3, I4, and I5 which will be energized when pins P2, P4, and P5 are energized from code converter 26. This will occur when combinatorial address 010110 is designated. As shown in FIG. 1, old combinatorial 010110 corresponds to no binary address, therefore bad line 13 will never be accessed. Good Y-line 20 will be effectively substituted for the bad one.

Referring to the table of FIG. 1, it is now clear that defective Y-lines 4 and 13, corresponding to binary addresses 0011 and 1100, and old combinatorial addresses 110001 and 001110 are replaced, by the system of this invention, by good Y-lines 17 and 20, as shown in the table under the heading "New Y-line NO.." By rewiring the decoderarray connections, the defective lines 4 and 13 are addressed by new combinatorial addresses 110001, and 001110. These have no corresponding binary address ("NONE" in FIG. 1). Therefore these bad lines will never be addressed and are effectively removed from the system.

Although the readdressing system shown in FIG. 1, substituting the new combinatorial addresses for the old combinatorial addresses by rewiring, changes the particular combinatorial addresses associated with each of the remaining 14 binary addresses, there is no overlapping and each old binary address has a unique combinatorial address which is associated with one of the remaining fourteen good Y-lines.

It should be apparent from the above description that, had there been four bad Y-lines rather than two, and four redundant Y-lines were included in the system rather that two, that a similar switching system could have been used to eliminate these additional bad Y-lines as well and substitute in their place the two additional redundant Y-lines. The addressing system would be changed in exactly the same manner as done for bad Y-lines 4 and 13, discussed above. In addition up to four X-lines can be substituted making the same changes in the X-line decoding and addressing matrix. This makes possible the substitution of a total of eight bad lines in the system, four X-lines and four Y-lines, without additional connection pads.

Referring now to FIG. 3, four memory circuits 40, 41, 42, and 43 are illustrated. According to the invention, it is assumed that circuit 40 has two bad Y-lines 44 and 45. Similarly circuit 41 has two bad Y-lines 46 and 47, circuit 42 has two bad Y-lines 48 and 49 and circuit 43 has two bad Y-lines 50 and 51. To substitute for these bad Y-lines in the system of FIG. 3, rather than having redundant Y-lines on each of the chips 40, 41, 42, and 43, each single chip is connected to a redundant chip 52. Although each of these five chips 40, 41, 42, 43, and 52 may have 16 Y-lines and 16 X-lines, exactly the same as the memory circuit shown in FIG. 2, only eight Y-lines and a single X-line 53 are shown for simplicity of illustration.

Using the same decoding system as described before in connection with FIG. 2, when the binary address for Y-line 44, for example, is received at the output of the decoding circuitry, the proper connections are made, as described before, so that instead of addressing Y-line 44 on chip 40 (which has been determined to be defective) Y-line 54 on chip 52 is addressed. The means of re-routing the addressing will not again be described here, as it is the same. The routing is schematically illustrated by connecting line 55 between Y-line 44 on chip 40 and Y-line 54 on chip 52. In the same manner, lines 56, 57, 58, 59, 60, 61, and 62 are used to illustrate the re-routing connections between the defective Y-lines 44, 45, 46, 47, 48, 49, 50, and 51 on chips 40, 41, 42, and 43, respectively, and redundant chip 52. For proper operation of this invention, chip 52 need have only eight good Y-lines even though it may be a sixteen by sixteen cell matrix with a maximum possibility of sixteen good Y-lines and sixteen good X-lines. The other eight Y-lines, whether good or defective, are not used in this illustration. It is essential, however, that all the X-lines on all five chips shown in FIG. 3 are operative to intersect all the operating Y-lines. However it does not matter whether the cells at the intersections of the X-lines with the defective Y-lines on chips 40, 41, 42, and 43 are operating cells or not. It is important, however, that the defective cells do not cause a complete break in the X-line or else the system of the invention would not be operative.

Using the basic principles of the invention, taking advantage of the extra combinatorial addresses converted from the binary addresses, many techniques may be used in practice to build the memory system. Although FIG. 2 shows the re-routing of two wires to eliminate the bad lines and substitute good ones, it is possible that proper logic may be employed in the code converter 26 itself to do the proper switching. It is well known to the logic designer that the proper combination of gates can be wired to achieve the code conversion desired. It is also within the scope of the invention to build memory cells having deposited interconnections which can be later severed by the user, after testing, to rewire the system to eliminate any bad bits or lines. The essence of the invention is merely the use of the additional combinatorial addresses to eliminate the bad rows, columns, or bits and switch the signals to redundant good columns, rows, or bits, whether or not the redundant rows are on the same monolithic chip of silicon, or on a different chip.

The system shown in FIG. 2 has two redundant columns on the chip. Additionally, if desired, the system may also have two redundan t rows. However, since only a sixteen by sixteen cell matrix is required, after the proper wiring to avoid defective rows or columns, only twelve address terminals to connect the chip to the decoder are required, six in the X-direction and six in the Y-direction. Normally two additional external connections are required for data inputs, and two for the power supply. Accordingly, the 256-bit memory chip, even with the redundancy of the invention, can still be put into a sixteen lead package. Such was not possible with redundant schemes of the prior art.

The proper definition of the invention is not contained in the specification, above, but only in the claims which follow.

What is claimed is:

1. A memory system having an array of a predetermined number of storage cells, each for storing a single bit of binary information, arranged in orthogonal lines, the lines each having binary addresses, comprising:

at least one redundant line of storage cells and one or more defective lines in the same direction as the redundant line, the contained cells of said redundant lines not being required to make up said predetermined number of storage cells and the number of redundant lines being at least equal to the number of defective lines;

a code converter permanently connected to electrically convert the binary addresses for each of the lines of the system to combinatorial addresses, each combinatorial address being associated with a line of the array, the maximum number of combinatorial addresses to which the binary addresses of all the lines may be converted being at least one more than the maximum number of binary addresses of all the lines in the same direction, there being no binary address associated with the additional combinatorial addresses; and means selectively connecting said code converter to said array of storage cells, and selective connection providing that said additional combinatorial addresses are associated with said defective lines, and the combinatorial addresses with which the binary addresses of the defective lines would normally be associated are associated with the redundant lines.

2. The memory system of claim 1 further characterized by said memory array being fabricated in monolithic chips of semiconductor material.

3. The memory system of claim 2 further characterized by said predetermined number of cells being in one single monolithic chip of semiconductor material and said redundant rows or columns of cells being in one or more different chips.

4. The memory system of claim 1 further characterized by said memory array being fabricated in a single monolithic chip of semiconductor material.

5. The memory system of claim 1 further characterized by the array having 256 binary bits and at least one redundant line.

6. The memory system of claim 1 further characterized by the array having 256 binary bits and at least one redundant line in one orthogonal direction and one in the opposite direction.

* * * * *